United States Patent [19]
Kubisiak

[11] Patent Number: 5,144,136
[45] Date of Patent: Sep. 1, 1992

[54] DEVICE FOR SIMULTANEOUSLY MEASURING PARTICLE OR QUANTUM BEAMS FROM MANY SAMPLES AT ONCE

[75] Inventor: Helmut Kubisiak, Dobel, Fed. Rep. of Germany

[73] Assignee: RSM Analytiche Instrumente GmbH, Fed. Rep. of Germany

[21] Appl. No.: 578,627

[22] Filed: Sep. 6, 1990

[30] Foreign Application Priority Data

Sep. 7, 1989 [EP] European Pat. Off. ........ 89116502.9

[51] Int. Cl.$^5$ ............................................. G01T 1/204
[52] U.S. Cl. ..................................... 250/328; 250/364
[58] Field of Search .................... 250/364, 362, 328

[56] References Cited

U.S. PATENT DOCUMENTS

| | | | |
|---|---|---|---|
| 3,796,879 | 3/1974 | Obrycki | 250/362 |
| 4,005,292 | 1/1977 | Oesterlin et al. | 250/364 |
| 4,298,796 | 11/1981 | Warner et al. | 250/361 R |
| 4,498,780 | 2/1985 | Banno et al. | 356/414 |
| 4,626,684 | 12/1986 | Landa | 250/328 |
| 4,933,554 | 6/1990 | Lehtinen et al. | 250/303 |
| 5,061,853 | 10/1991 | Lehtinen et al. | 250/328 |

FOREIGN PATENT DOCUMENTS

| | | | |
|---|---|---|---|
| 0233497 | 8/1987 | European Pat. Off. | |
| WO89/12838 | 12/1989 | PCT Int'l Appl. | |
| 2196734 | 5/1988 | United Kingdom | 250/227.14 |

Primary Examiner—Carolyn E. Fields
Assistant Examiner—Drew A. Dunn
Attorney, Agent, or Firm—Ostrolenk, Faber, Gerb & Soffen

[57] ABSTRACT

A device for simultaneously measuring the level of particle and quantum radiation of a plurality of samples which includes a microplate having a plurality of wells for accommodating the plurality of samples. A plurality of light conductors, at least one for each well, is positioned to receive light from each well and forward it to a photodetector. When luminescence is determined, each well has only one conductor associated therewith and when liquid scintillation is determined, each well has two light conductors associated therewith.

2 Claims, 2 Drawing Sheets

DEVICE FOR SIMULTANEOUSLY MEASURING PARTICLE OR QUANTUM BEAMS FROM MANY SAMPLES AT ONCE

BACKGROUND OF THE INVENTION

To measure particle or quantum radiation, especially that of low-energy particles, liquid isotopes called liquid scintillators are added to the sample, which may be liquid or solid, to convert the particles or quanta into a photon beam of proportional energy. The samples are introduced along with the liquid scintillator into a transparent container of glass or plastic, for example. The photons travel through the walls of the container, and their radiation is detected by light-sensitive detectors. The light-sensitive detectors employed in known instruments are photomultipliers which can measure individual photons. In order to eliminate cathode noise, the photomultipliers are employed in a coincident mode, that is, two photomultipliers are positioned against the sample container where they can count only the particle beams that simultaneously supply a signal to both multipliers with a period of coincidence, usually 20 nanoseconds. The counting rate arriving from the detectors is calculated by electronic data processing and subtracted from the overall signal, or detected and eliminated by special logic circuits.

To obtain sufficient precision from these tests they are usually maintained for between one and ten minutes. In practice, many more than one sample is involved, and systems with as many as six pairs of detectors are known. Providing the instruments with an automatic sample replacer is also known. Automatic sample replacers that can handle up to 500 samples, which must, however, be measured sequentially for the appropriate length of time, are already being employed. The lengthiness of the known procedures is a drawback for many reasons. A sample replacer that can handle 500 samples at as little as 1 minute per test takes more than 8 hours to complete the series. When a test takes 10 minutes, it takes 80 hours to process 500 samples. Since the samples can change in many ways over time, another drawback is that the results will no longer represent the original conditions.

Also known are what are called automatic sample-preparation systems, wherein the samples are automatically pipetted into standard microplates with 96 wells each. This approach takes 1.6 to 16 hours.

SUMMARY OF THE INVENTION

The object of the present invention is a device for simultaneously measuring and processing particle or quantum beams from many samples at once.

In accordance with the present invention, the foregoing and other objects are attained by a device for simultaneously measuring the level of particle or quantum radiation of a plurality of samples which includes a microplate having a plurality of wells for respectively accommodating the plurality of samples. Each well is completely enclosed with an opening at the top and includes photon reflecting walls. A plurality of light conductors, at least one for each well, are positioned through the tops of the wells to receive the light emanating therefrom. Means are provided for simultaneously measuring the light received by the light conductors and for determining the respective radiation level of the samples therefrom.

The objects, advantages, and features of the present invention will be better understood when considered in connection with the appended drawings in which:

DETAILED DESCRIPTION

Figure 1:
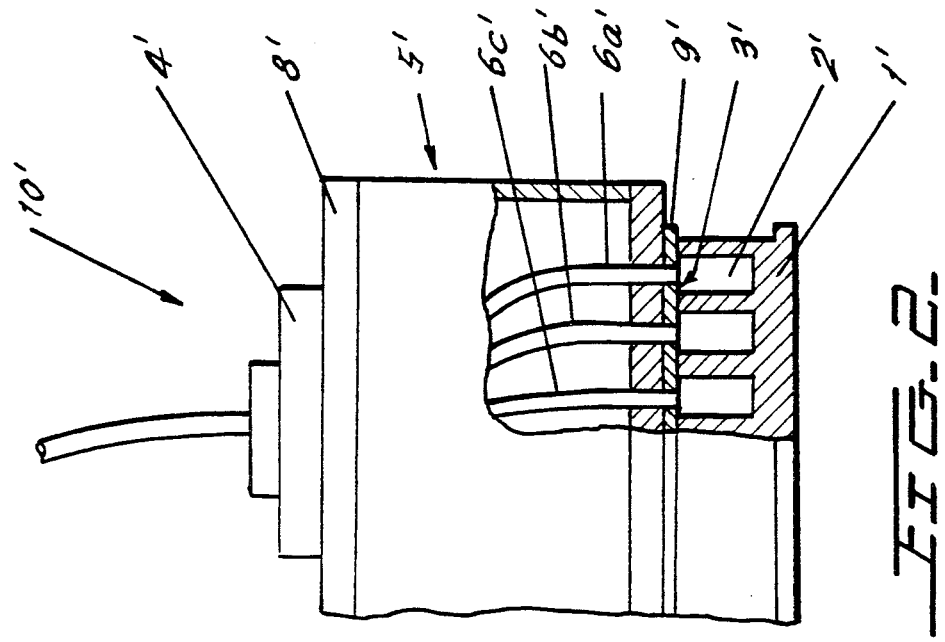
FIG. 1 is a partly sectional view of a device in accordance with the present invention with two light conductors.
Figure 2:
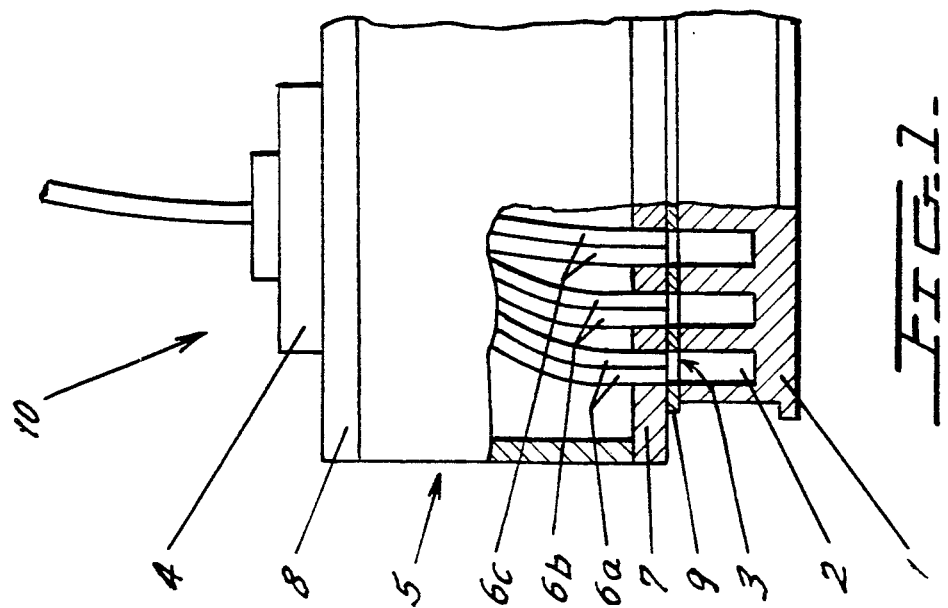
FIG. 2 is a partly sectional view of a device in accordance with the present invention with one light conductor.

Referring to FIGS. 1 and 2, there are shown devices 10 and 10' for simultaneously measuring particle or quantum beams from many samples at once. The devices 10 and 10' are identical except as specifically noted and each includes an in-itself known microplate 1, 1'—the standard version of which can accommodate 96 samples in wells 2, 2' that are enclosed all around and have openings 3, 3' and walls that reflect light—and of a photodetector 4, 4' with a system 5, 5' of light conductors extending between microplate 1, 1' and photodetector 4, 4'. Photodetector 4, 4' can be a position-sensitive or local resolution photomultiplier like the XP 47 02 marketed by Philips or the R 24 86 marketed by Hamamatsu or a position-sensitive or local-resolution microchannel plate like that marketed by Hamamatsu.

System 5, 5' of light conductors comprises light conductors 6a, 6a', 6b, 6b', 6c, 6c', etc. positioned between a base plate 7, 7' and a cover plate 8, 8'. Base plate 7, 7' has a lid 9, 9' that completely covers the openings 3, 3' at the top of the wells 2, 2' in microplate 1, 1' while allowing light conductors 6, 6' to extend therethrough. Photon detector 4, 4' is mounted on cover plate 8, 8'.

When the present device operates in the capacity of a photon counter, system 5' of light conductors will always have only one light conductor 6a', 6b', 6c', etc. between wells 2' and photodetector 4' (FIG. 2). When the device operates as a liquid scintillator on the other hand, there will always be two light conductors 6a, 6b, 6c, etc. between the wells and the photodetector (FIG. 1).

How the device works will now be described. Assuming that wells 2, 2' are full of a liquid that is to be tested and that emits quanta and that microplate 1, 1' rests tight against the base plate 7, 7' of system 5, 5' of light conductors, the radiation from the liquid in every sample will be conveyed simultaneous to photodetector 4, 4' by way of light conductors 6a, 6a', 6b, 6b', 6c, 6c', etc., amplified in a known way, and forwarded in the form of a signal to an in-itself known electronic-processing system.

Figure 3:
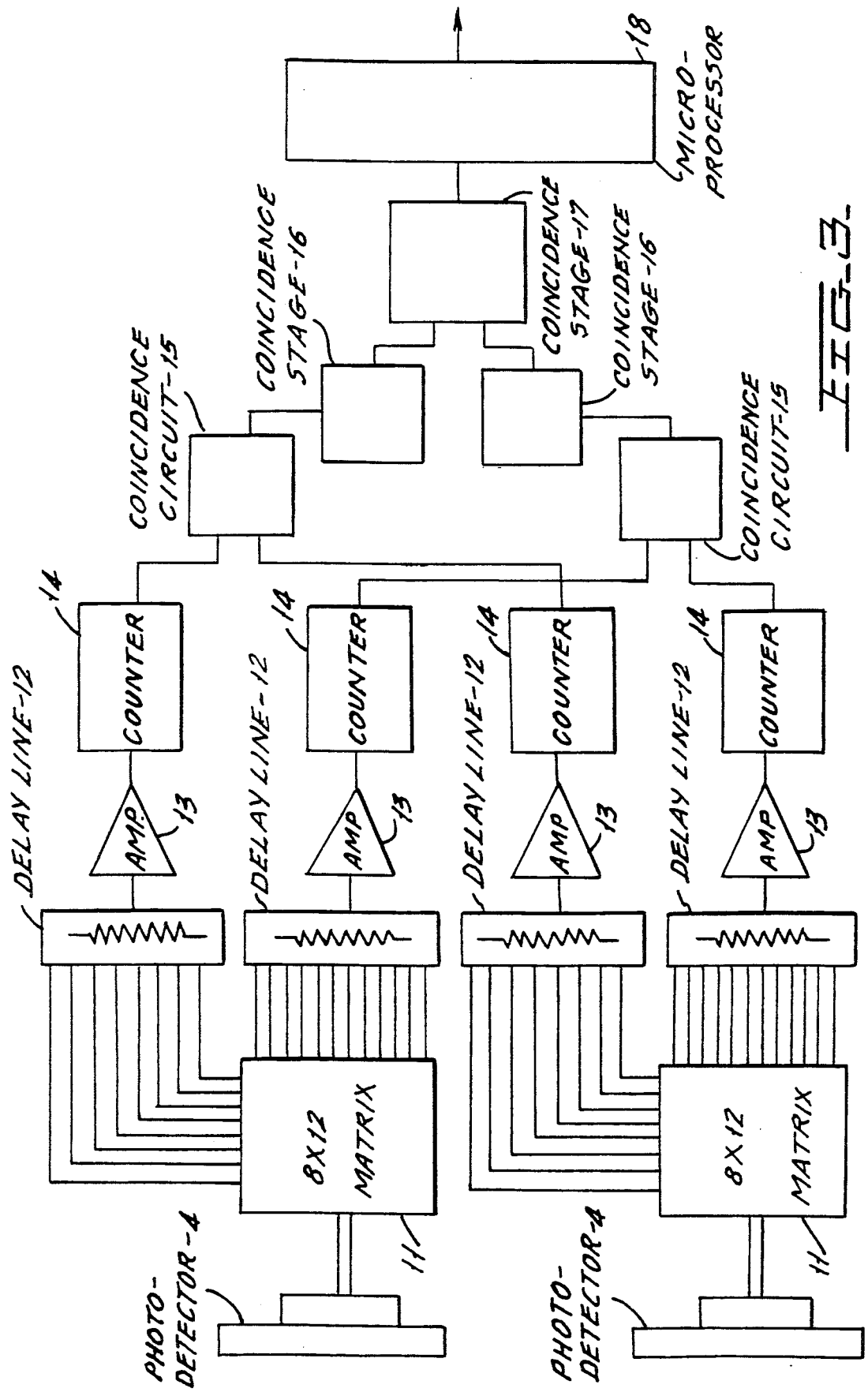
FIG. 3 is a block diagram of a device in accordance with the present invention in the form of a liquid scintillator operating in a coincident mode.

When the device is employed as a liquid-scintillation counter, the signal is forwarded to the processing system in coincidence to a pair of $8 \times 12$ matrices 11 as illustrated in the block diagram in FIG. 3. As is well known, the position of the matrices 11 may be decoded by using, for example, delay lines 12 and by time measurement between the ends of the delay lines 12. The resultant signals are then amplified by, for example, charge sensitive amplifiers 13. Counters 14 are employed to determine the X-Y position of the photodetector. The counters 14 are started on the first measured event and are stopped with the event coinciding with the end of the delay line. After X-positions and Y-positions are compared in the coincidence circuits 15, the results are compared in additional coincidence stages 16 and 17 and finally evaluated by a microprocessor 18.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A device for simultaneously measuring the levels of liquid scintillation of a plurality of samples, comprising:

a microplate having a plurality of wells for respectively receiving a plurality of samples of light-radiating material, each well being enclosed, having an opening at the top and having photon reflecting walls;

a plurality of light conductors, at least two for each well, each light conductor being positioned through the opening at the top of a well to receive the light emanating from the sample in the well; and means for simultaneously measuring the light received by the light conductors and for determining therefrom the respective level of liquid scintillation of each sample, said means including first means for processing the signals from each of a first one of the two light conductors associated with each well, second means for processing the signals from each of a second one of the two light conductors associated with each well, and means for comparing the outputs of the first and second processing means to determine the liquid scintillation level of each sample.

2. A device as in claim 1, wherein the measuring means includes a photodetector.

* * * * *